March 16, 1971  L. H. MOTT  3,570,059

SPINNERETTE HEAD FILTER

Filed July 24, 1969

INVENTOR:
LAMBERT H. MOTT
BY Peter L. Tailer
ATTORNEY

United States Patent Office 3,570,059
Patented Mar. 16, 1971

3,570,059
SPINNERETTE HEAD FILTER
Lambert H. Mott, % Mott Metallurgical Corp., Farmington Industrial Park, P.O. Drawer "L," Farmington, Conn. 06032
Continuation-in-part of application Ser. No. 676,316, Oct. 18, 1967. This application July 24, 1969, Ser. No. 847,802
Int. Cl. D01d 3/00
U.S. Cl. 18—8                                    5 Claims

ABSTRACT OF THE DISCLOSURE

The central cavity of a spinnerette head assembly for the extrusion of synthetic polymer fibers is substantially filled with tubular filters closed at one end and communicating with extrusion orifices, the filter area presented to inflowing plastic being at least twice the cross-sectional area of the central cavity.

RELATED APPLICATIONS

This application is a continuation-in-part of my presently pending patent application, Ser. No. 676,316, filed Oct. 18, 1967, now abandoned.

BACKGROUND OF THE INVENTION

A conventional spinnerette head assembly for the extrusion of synthetic polymer fibers contains a large central cavity into which plastic material is forced at extrusion pressures. A spinnerette disk is fixed to the spinnerette head assembly and contains small extrusion orifices through which individual fiber strands are extruded. A flat porous filter is usually placed in the cavity in front of the spinnerette disk to filter foreign particles from the plastic and prevent clogging of the extrusion apertures. The porous filter also serves to condition the plastic for extrusion as it shears lumps or inconsistencies in the plastic passing through it. In many cases, marbles or sand are placed in the cavity behind the flat conventional porous filter to reduce the effective volume of the cavity which may be filled with plastic. This invention provides a spinnerette head assembly with a superior filter.

SUMMARY OF THE INVENTION

A spinnerette head assembly for extrusion of synthetic polymer fibers has a cup shaped holder containing a central cavity, a bottom plate of said holder containing passages, a spinnerette disk containing extrusion orifices fixed below said bottom plate, a filter disk sealed in said cavity above said bottom plate, said filter disk containing passages therethrough, and tubular filter elements substantially filling said cavity, each tubular filter element having one end fixed to said filter disk about one of the passages therethrough and each filter element having a closed free end. The area of the tubular filter elements is at least twice the cross-sectional area of the central cavity.

Since the tubular filter elements substantially fill the cavity of the spinnerette head assembly, sand or marbles need not be used for this purpose. In addition, the tubular filter elements present a much larger area of a given thickness for filtering purposes so that, with a given filter pore size, a longer service life before clogging results. In some instances a finer pore size for better filtering may be used in the filter of this invention with a service life equivalent to that of a conventional filter.

DESCRIPTION OF THE PREFERRED EMBODIMENT

Figure 1:
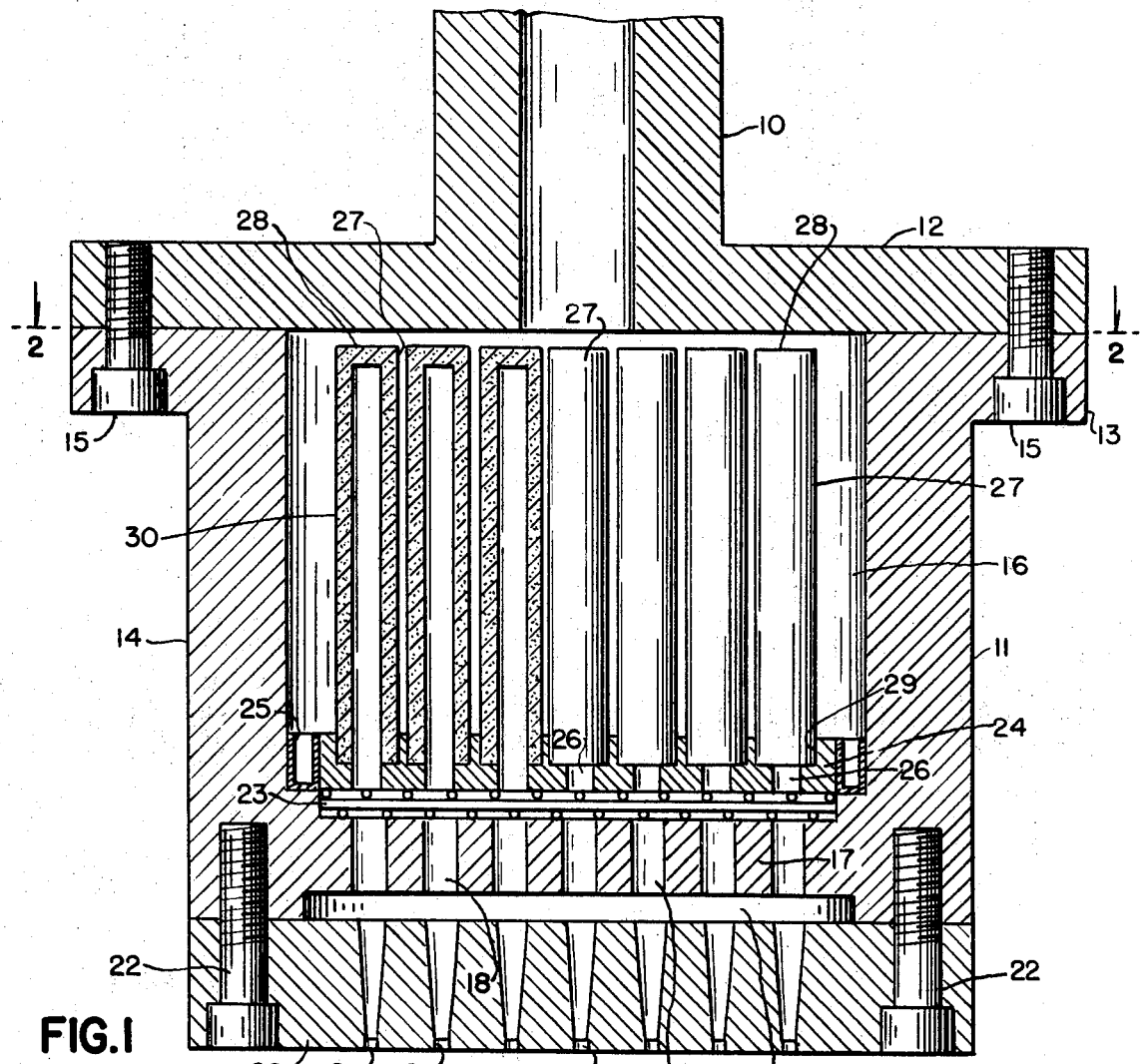
FIG. 1 is a longitudinal section through a spinnerette head assembly according to this invention.
Figure 2:
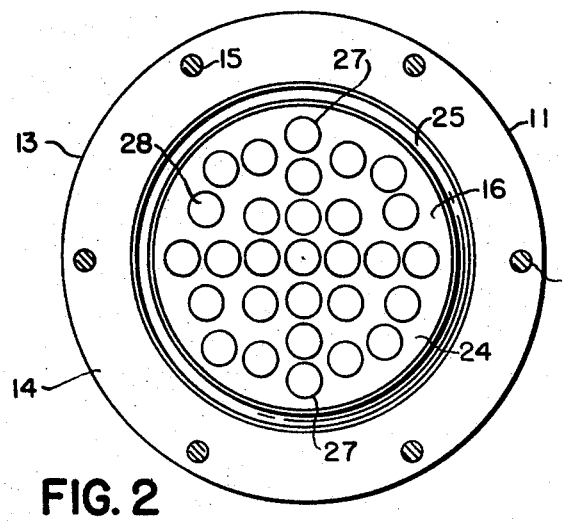
FIG. 2 is a section taken on line 2—2 of FIG. 1.

As shown in FIGS. 1 and 2, plastic at extrusion pressures, which may be several thousand p.s.i., is forced through a feed pipe 10 into the spinnerette head assembly 11. Pipe 10 has a flange 12 formed at its end to which a corresponding flange 13 of the cup-shaped holder 14 is fixed by the bolts 15. Holder 14 contains a large central cavity 16 below which is an end wall 17 containing passages 18. The undersurface of end wall 17 has a circular recess 19 formed therein with which the passages 18 communicate. An extrusion disk 20, known as a spinnerette disk, contains the extrusion orifices 21 through which fibers are extruded. Spinnerette disk 20 is fixed to holder 14 by the bolts 22.

A screen 23 may be disposed over end wall 17 to have a filter disk 24 placed over it. A U-shaped seal 25 of aluminum or other relatively soft material prevents leakage of plastic around the periphery of disk 24. Disk 24, which may be of solid metal such as stainless steel, contains a plurality of passages 26 extending through it which are preferably aligned with the passages 18 in end wall 17. A tubular porous filter element 27 is fixed over each passage 26. The filter elements 27 are closed at their free ends 28 and may be fixed to disk 24 by being pressed into the larger openings 29 which are formed coaxially with the passages 26.

The tubular filter elements 27 are formed from a porous sintered material which is preferably of stainless steel. The filter elements 27 extend upward through almost the entire depth of cavity 16 so that they occupy at least one third the volume thereof above disk 24.

In operation, molten plastic enters cavity 16 through pipe 10 under great pressure to flow through the filtering area of the walls 30 of the porous tubular filter elements 27. The filtered plastic then passes through the passages 26 in filter disk 24, diffuser screen 23, the passages 18, and recess 19 to be extruded through the orifices 21. The orifices 21 need not be aligned in a one to one relation with the filter elements 27 and the passages 18 as shown. Thus, even if there are relatively few extrusion orifices in a spinnerette disk 20, the cavity 16 may be substantially filled by a larger number of filter elements 27 feeding into the recess 19.

Further, particularly if filter disk 24 is of solid metal, it may be seated and sealed lower than shown in FIG. 1 so that diffuser screen 23 and end wall 17 will not be required and plastic flowing from passages 26 will directly enter recess 19.

Figures 3, 4:
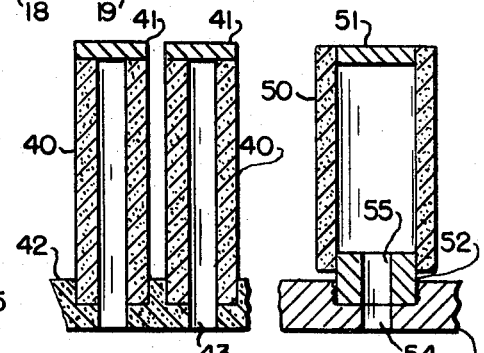
FIG. 3 is a longitudinal section through a fragment of a filter plate with tubular filter elements fixed therein showing a first modification of this invention.
FIG. 4 is a longitudinal section through a fragment of a filter plate with a tubular filter element fixed therein showing a second modification of this invention.

The filter elements 27 shown in FIG. 1 are integrally formed of porous material. As shown in FIG. 3, filter elements 40 may be formed from lengths of porous tubing having their free ends closed by caps 41 which may be soldered in place. As is also shown in FIG. 3, the filter disk 42 containing the passages 43 may itself be of a porous material to increase the total filter area available. Such a filter disk 42 would probably require the support provided by end wall 17 and diffuser screen 23 to withstand the high extrusion pressures.

FIG. 4 shows a second modification of this invention in which a tubular filter element 50 has an upper plug 51 fixed in its free end and a lower plug 52 containing a passage 55 fixed in its lower end. Plug 52 may be threaded to be screwed into filter disk 53 if desired, or it may be pressed, soldered, or otherwise secured in place about a passage 54.

It has been found in the practice of this invention that the use time of a spinnerette head assembly before it must be disassembled for the cleaning of the filters varies almost directly according to the filter area presented to the inflowing synthetic polymer. Thus the increasing of the filter area at least twice in this restricted environment substantially increases the period of service of a spinnerette head assembly. This represents a great saving which was not heretofore anticipated. In one application of this invention, the filter area was increased to five times the cross-sectional area of the central cavity which increased the use time of the assembly almost five times over the use time when conventional disk filters are used which have a filter area about equal to the cross-sectional area of the cavity. This invention has been tested with nylon, polyester, and polypropylene.

While I have shown and described my invention in the best forms known, it will nevertheless be understood that modifications may be made without departing from the spirit and scope of the invention except as it may be more limited in the appended claims wherein:

I claim:

1. A spinnerette head for the extrusion of synthetic polymer fibers comprising, in combination, a filter disk containing passages therethrough, a holder having means securing and sealing said filter disk therein, said holder containing a large central cavity in front of said filter disk and a recess beyond said filter disk, a pipe introducing plastic at extrusion pressures into the large central cavity of said holder, a spinnerette disk containing extrusion apertures fixed to said holder over said recess, and tubular filter element of porous material each having a fixed end fixed to said filter disk about at least one of said passages through said filter disk and having a sealed free end, said tubular filter elements occupying at least one third the volume of said central cavity and having a filter area at least twice the cross-sectional area of said cavity.

2. The combination according to claim 1 wherein said filter elements are of sintered porous metal.

3. The combination according to claim 2 wherein said holder has an end wall containing passages aligned with the passages in said filter disk, and with the addition of a diffuser screen over said end wall, said filter disk resting on said diffuser screen, said recess being formed in said end wall.

4. The combination according to claim 3 wherein said filter disk is of porous metal.

5. The combination according to claim 2 wherein said filter elements are integrally formed of porous metal having a cylindrical wall and sealed end.

References Cited

UNITED STATES PATENTS

| | | | |
|---|---|---|---|
| 2,078,509 | 4/1937 | Prutton | 18—8 |
| 3,295,161 | 1/1967 | Mott | 18—8 |

TRAVIS S. McGEHEE, Primary Examiner